(12) United States Patent
Arnold

(10) Patent No.: US 11,358,394 B2
(45) Date of Patent: Jun. 14, 2022

(54) PRINT RESERVOIR VENTING

(71) Applicant: Hewlett-Packard Development Company, L.P., Spring, TX (US)

(72) Inventor: Christopher John Arnold, Vancouver, WA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 17/049,495

(22) PCT Filed: Aug. 10, 2018

(86) PCT No.: PCT/US2018/046191
§ 371 (c)(1),
(2) Date: Oct. 21, 2020

(87) PCT Pub. No.: WO2020/032968
PCT Pub. Date: Feb. 13, 2020

(65) Prior Publication Data
US 2021/0237460 A1    Aug. 5, 2021

(51) Int. Cl.
*B41J 2/175* (2006.01)
*B29C 64/321* (2017.01)
*B29C 64/255* (2017.01)
*B33Y 30/00* (2015.01)

(52) U.S. Cl.
CPC ......... *B41J 2/17556* (2013.01); *B29C 64/255* (2017.08); *B29C 64/321* (2017.08); *B41J 2/17596* (2013.01); *B33Y 30/00* (2014.12)

(58) Field of Classification Search
CPC .............. B41J 2/17503; B41J 2/17556; B41J 2/17566; B41J 2/17596
See application file for complete search history.

(56) References Cited

U.S. PATENT DOCUMENTS

| 5,040,002 A * | 8/1991 | Pollacek | B41J 2/175 347/87 |
| 5,963,237 A | 10/1999 | Ikkatai | |
| 6,243,115 B1 | 6/2001 | Baker et al. | |
| 7,543,923 B2 | 6/2009 | McNestry | |

(Continued)

FOREIGN PATENT DOCUMENTS

| EP | 2227416 B1 | 6/2012 |
| WO | WO-2010066436 A1 | 6/2010 |
| WO | WO-2017000997 A1 | 1/2017 |

*Primary Examiner* — Anh T Vo
(74) *Attorney, Agent, or Firm* — Austin Rapp

(57) ABSTRACT

Some examples include a print substance reservoir for a printing system including a housing to be arranged within a printing device, the housing having an interior for containing a print substance and an exterior, an active vent valve to allow gases to travel from the interior to the exterior when the inlet is receiving the print substance, the active vent valve electrically energizable and de-energizable in response to signals corresponding to the transfer of the print substance into the housing, a passive inlet valve to open to allow air to enter the interior during removal of the print substance from the reservoir, the passive inlet valve biased to a closed position, and a passive pressure relief valve to open when pressure within the interior is greater than a predetermined pressure limit, the passive pressure relief valve biased to a closed position.

13 Claims, 3 Drawing Sheets

(56) References Cited

U.S. PATENT DOCUMENTS

| | | | |
|---|---|---|---|
| 7,874,656 B2 * | 1/2011 | Ota | B41J 2/17556 |
| | | | 347/85 |
| 8,256,871 B2 | 9/2012 | Platt | |
| 8,550,612 B2 | 10/2013 | Park et al. | |
| 9,506,382 B2 * | 11/2016 | Yeager | F01L 1/181 |
| 2008/0284832 A1 | 11/2008 | Chung et al. | |

* cited by examiner

PRINT RESERVOIR VENTING

BACKGROUND

Print systems, such as printers, copiers, etc., may be used to form markings on a physical medium, such as text, images, etc. A print system can perform two-dimensional (2D) or three-dimensional (3D) printing operations. In some examples, print systems may form markings on the physical medium by dispensing a liquid print substance onto a substrate surface. For example, a 2D printer may operate to dispense fluid, such as ink, onto a surface, such as paper, in a predetermined pattern. In another example, an additive manufacturing liquid is dispensed as part of a 3D additive manufacturing operation. Imaging systems can include a reservoir housed within a printing device to contain and store a supply of a print substance until it is used to form markings on the medium.

DETAILED DESCRIPTION

Figure 1:
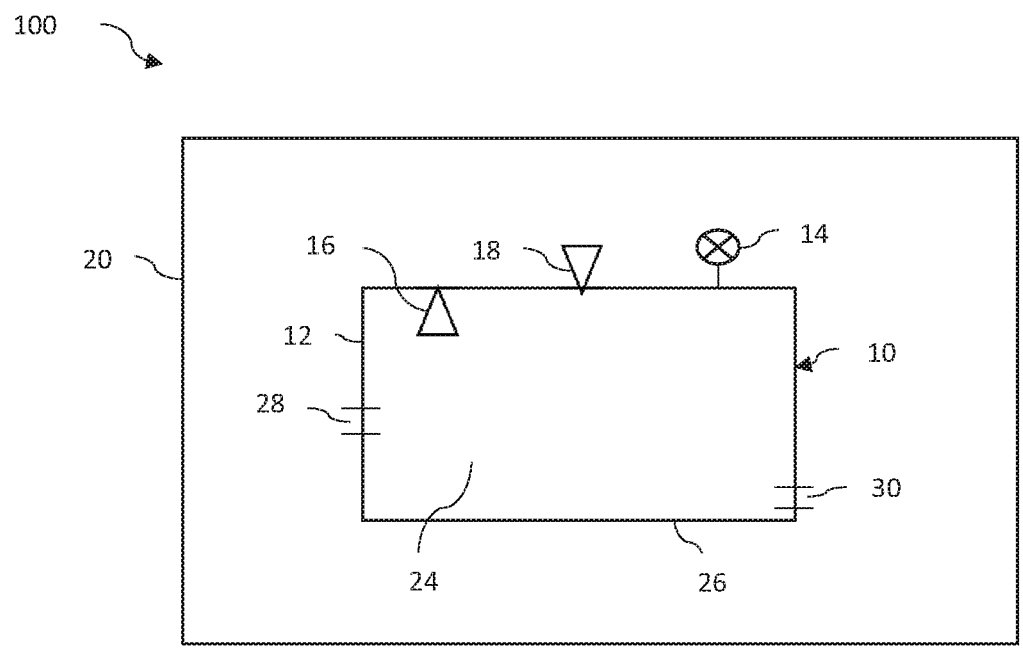
FIG. 1 is a schematic diagram of an example print substance reservoir for a printing system in accordance with aspects of the present disclosure.

In the following detailed description, reference is made to the accompanying drawings which form a part hereof, and in which is shown by way of illustration specific examples in which the disclosure may be practiced. It is to be understood that other examples may be utilized and structural or logical changes may be made without departing from the scope of the present disclosure. The following detailed description, therefore, is not to be taken in a limiting sense, and the scope of the present disclosure is defined by the appended claims. It is to be understood that features of the various examples described herein may be combined, in part or whole, with each other, unless specifically noted otherwise.

In general, print systems can create physical representations, patterns, or images by depositing a print substance on a print medium in a desired pattern. Printing devices can deposit print substance onto the physical medium during an imaging or printing process. In some examples, imaging devices deposit quantities of print substance onto the printable medium based on job attributes, or print parameter, of a print job. A print parameter represents a characteristic of a print job.

The printing device can include any hardware device with functionalities to physically produce representation(s) (e.g., text, images, models, etc.) on media. The media can include various types of print media, such as paper, photopolymers, plastics, composite, and can include any suitable object or materials to which a print substance from a printing device can be applied including materials such as powdered build materials for forming three-dimensional articles. Print substances such as printing agents, marking agents, and colorants, can include toner, liquid inks, or other suitable marking materials that may or may not be mixed with fusing agents, detailing agents, or other materials and can be applied to the medium. Print substance, such as ink in a 2D printer or an additive manufacturing liquid in a 3D printer, is deposited on a surface from a printing device. In some examples, the printing devices, such as inkjet printers, deposit a liquid print substance that is ejectable from a printhead, such as ink, toner, binding agent, or the like.

The printing systems with continuous print substance systems can be provided as a continuous source of print substance for printing operations. Print substance is supplied from a reservoir that holds a volume of print substance prior to being ejected during printing operations. The reservoir holds a volume of print substance that is passed to the printing device and ultimately deposited on a surface. In some examples, such as a continuous print substance system, the reservoir is internal to the printing device. In some examples, more than one reservoir is arranged within the printing device. For example, each of a quantity of reservoirs arranged in the printing device can be contain a different type or color of ink useful during the printing process (e.g., red, green, blue, black). Large two-dimensional (2D) and three-dimensional (3D) printers can use significant amounts of print substance when performing print jobs. Including large reservoir(s) to maintain large volume(s) of print substance within the reservoir(s) of the printing device can be useful to minimizing the filling operations. Stored volumes of print substance can be depleted from the reservoir through use during the print process. Refilling or topping off the volume of the depleted print substance volume in the reservoir can be useful.

A print substance can be supplied to the reservoir by a supply source. The reservoir(s) can be filled and refilled with print substance from replaceable supply sources (e.g., containers) and that are fluidly coupled to the reservoirs during a filling operation and removed subsequent to the filling operation. The supply source can be removably connected to the reservoir through a connection port. A supply pump can aid the transfer of print fluid from the supply source to the reservoir and maintain pressurization. Venting can be included at the reservoir wherein a pressure within the reservoir housed within the printing device is changed by a filling or refilling process of print substance into the reservoir or as print substance is extracted from the reservoir during a print operation. For example, the reservoir can desirably allow for air or other gases to travel from the reservoir during filling operations as print substance fills the interior volume and desirably allow for air or other gases to enter the reservoir as print substance is removed from the reservoir during printing operations. As used herein, air can include other gaseous substances.

It is desirable that any printing substance within the reservoir of the printing device be fluidly contained within the reservoir without inadvertent leakage. During shipment and transport of a printing device, the printing device may experience handling conditions such as being turned upside down or on its side, experience shocking vibes, high altitudes, high temperatures, etc. leading to potential leaking. The reservoir should be capable of maintaining print substance contained within the reservoir without allowing any of print substance to escape during a number of shipping conditions. Openings in the reservoir formed for selective venting useful during printing operations can be potential sources of leakage during shipping. The reservoir should include venting that is securely fluidly sealable during conditions such as shipping and transporting of the printing device in order to prevent the accidental spillage of the fluid during transportation or other event.

FIG. 1 is a schematic drawing of an example print substance reservoir 10 for a printing system 100 in accordance with aspects of the present disclosure. The print substance reservoir, or reservoir, 10 includes a housing 12, an active vent valve 14, a passive inlet valve 16, and a passive pressure relief valve 18. The housing 12 can be arranged within a printing device 20. The active vent valve 14, the passive inlet valve 16, and the passive pressure relief valve 18 are disposed on or through the housing 12 with each of the valves 14, 16, 18 independently providing sealable passageways between an interior cavity, or interior, 24 and an exterior 26 of the housing 12 of the reservoir 10, as discussed further below.

The housing 12 is suitable to fluidly contain a print substance within the interior 24. The exterior 26 can be suitably attached within the printing device 20 and is open to ambient air (e.g., within the printing device 20). The size and shape of the reservoir 10 is appropriate to maintain a predetermined volume of print substance and can allow for a volume of gas (e.g., air) to be contained above print substance. In some examples, where more than one reservoir 10 is arranged within the printing device 20, the reservoirs 10 can have the same or differing sizes and shapes as appropriate to fit within the printing device 20 and to each hold a predetermined volume of print substance. The volumes of print substance and gases (e.g., air) within each reservoir can be correspondingly adjustable relative to each other. For example, gases can be venting into and out of the reservoir 10, such as during filling and extraction operations of print substance into and from the reservoir 10, respectively. In some examples, the volumes of print substance and gases can maintain a predetermined pressurization within the reservoir 10. The housing 12 can be formed of a rigid, or semi-rigid, material suitable to maintain a manufactured shape during use within a printing device, including pressurization and de-pressurization of the reservoir 10 during print substance filling and extraction operations. In one example, the reservoir is a high-density polyethylene (HDPE), although other materials are also suitable. The housing 12 of the reservoir 10 includes an inlet 28 to receive print substance and an outlet 30 to extract print substance in response to printing operations of the printing system to forming markings on a medium.

The reservoir 10 includes the active vent valve 14, the passive inlet valve 16, and the passive pressure relief valve 18 disposed at or through the housing 12 for selective fluid transfer of gases (e.g., air) into and out of the reservoir, such as when print substance is received or extracted from the reservoir, as described further below. Each of the valves 14, 16, 18 are independently resealable passageways between an interior 24 and an exterior 26 of the housing 12. The valves 14, 16, 18 can be disposed above a predetermined maximum fill level of the interior cavity 24 of the reservoir 10. In some examples, the resealable valves 14, 16, 18 can include a resealable membrane and/or a movable valve member and biasing member to bias the valve member towards a valve seat to selectively fluidly open and close. Any number of suitable one-way valve types can be employed.

The active vent valve 14 can be selectively fluidly opened, for example, when the interior cavity 24 is receiving print substance through the inlet 28, as described further below. The active vent valve 14 can selectively allow gases to travel from the interior 24 of the reservoir 10 to the exterior atmosphere. In some examples, the active vent valve 14 is electrically energizable to operably open in response to signals corresponding to transfer of, or receiving of, print substance into the interior 24 of the reservoir 10 and the active vent valve 14 is electrically de-energizable in response to signals corresponding to the ceasing of transfer of the print substance into the reservoir 10. The active vent valve 14 is electrically de-energized to maintain or return the active vent valve 14 in a fluidly closed state or position unless electrically activated to open. The active vent valve 14 is an electro-mechanical valve that uses electrical energy to transition the active vent valve 14 between open and closed states. In one example, the active vent valve 14 is a solenoid valve. Other types of active (e.g., electrically energized) one-way vent valves are also acceptable.

The reservoir 10 also includes the passive pressure relief valve 18 to allow the reservoir 10 to vent gases from within the interior cavity 24 to the exterior 26. The passive pressure relief valve 18 is biased to a closed position. The passive pressure relief valve 18 can be transitioned from a closed position to an opened position in response to an increase in pressure within the reservoir. For example, the passive pressure relief valve 18 has a desired cracking pressure, or opening pressure differential, between the interior and exterior of the reservoir. In one example, the passive pressure relief valve has an opening, or cracking, pressure of 10 pounds per square inch (PSI) or approximately 69 kilopascals (kPa). The desired cracking pressure of the passive pressure relief valve 18 is predetermined to maintain the passive pressure relief valve 18 in the closed position during normal filling, operating, and shipping occurrences. In some examples, the passive pressure relief valve 18 is transitionable to the open position in the event of failure of the active vent valve operation during a filling operation. The passive pressure relief valve 18 can be any type of one-way flow control check valve. For example, the passive inlet valve 16 can be an umbrella, duckbill, or other passive one-way valve.

The reservoir 10 includes the passive inlet valve 16 to selectively allow gases (e.g., air) from the atmosphere to enter the internal volume of the reservoir 10, for example, during removal of print substance from the interior 24 of the reservoir 10. The passive inlet valve 16 is biased to a closed position. The passive inlet valve 16 is included to selectively open to allow gases to enter the interior 24 of the reservoir 10 and close to prevent transfer of print substance out of the reservoir 10 through the passive inlet valve 16. The passive inlet valve 16 is a re-sealable valve that can include a membrane and/or a valve member and biasing member to bias the valve member towards a valve seat. The passive inlet valve 16 can be any available passive one-way flow control check valve.

In some examples, the passive inlet valve 16 can be transitioned from a closed state to an open state with relatively small pressure drop. For example, the passive inlet valve 16 can be opened in response to a pressure drop corresponding to flow of approximately 10 inches (25.4 centimeters) of water, or approximately 0.5 PSI (3.45 kPa). The passive inlet valve 16 is openable to allow gases (e.g., air) to enter the reservoir 10 as print substance is removed from the reservoir 10, such as during a printing operations. Gases enters through the opened passive inlet valve 16 in a volume and at a speed that is equivalent to the volume and speed removal of print substance from the reservoir 10. In some examples, the passive inlet valve 16 can have a cracking pressure that is relatively lower than the cracking pressure of the passive pressure relief valve 18 (see, e.g., FIG. 2).

Figure 2:
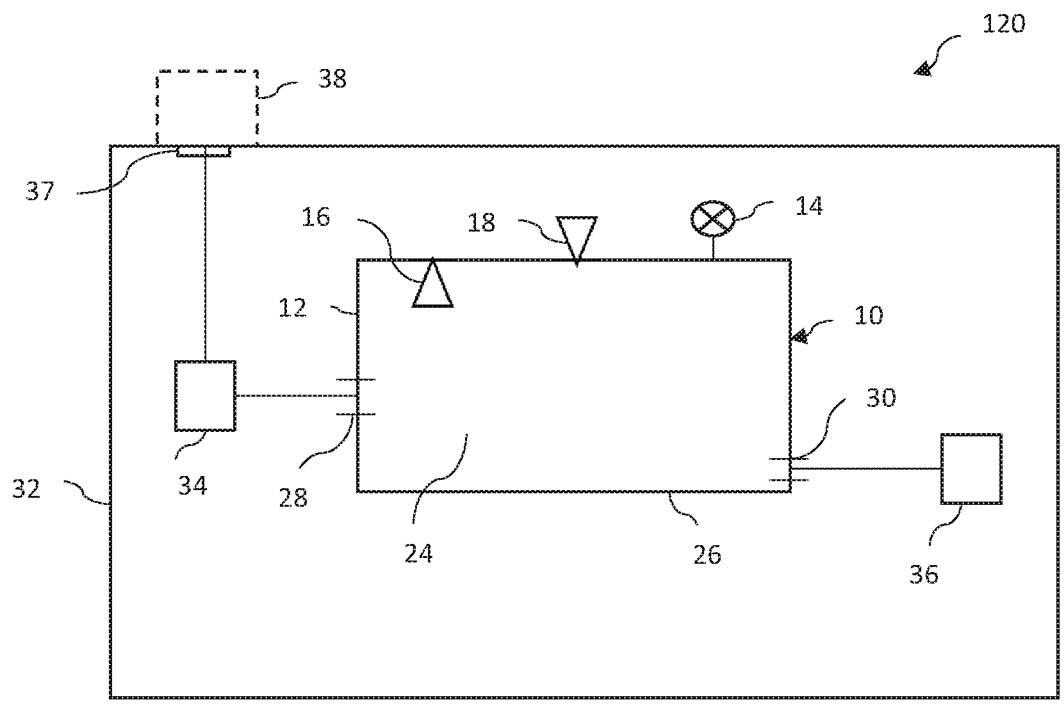
FIG. 2 is a schematic diagram of an example printing device including the print system reservoir of FIG. 1 in accordance with aspects of the present disclosure.

FIG. 2 is a diagrammatic view of an example printing device 120 including the reservoir 10 in accordance with aspects of the present disclosure. The printing device 120 includes a print device housing 32, the reservoir 10, a supply pump 34, and a printhead 36. The reservoir 10 is arranged within the print device housing 32 of the printing device 120. As discussed above, the reservoir 10 includes the interior cavity 24 to contain print substance for use by the printing device 120 during printing operations to form markings on a medium.

The reservoir 10 can be filled or refilled with print substance as the volume of print substance in the reservoir is depleted through use in printing operations. Print substance is transferable into the reservoir 10 of the printing device 120 from a supply source 38. The supply source 38 can be any container suitable to contain and transport print substance, including a pliable container that conforms to the contents disposed therein. The supply source 38 is selectively fluidly connectable to the reservoir 10. The printing device 120 can include an input port 37 as an interface to receive print substance, such as ink, from the supply source 38. Connection between the supply source 38 and the input port 37 of the printing device 120 can cause the printing device 120 to receive an amount, or volume, of print substance into the reservoir 10 of the printing device 120. The supply source 38 can be disconnected from the inlet of the reservoir 10 upon completion of the transfer of the print substance from the supply source 38.

The supply pump 34 can assist with the transfer of print substance from the supply source 38 into the reservoir 10. Print substance can be received into the reservoir 10 through the inlet 28. The printhead 36 is fluidly coupled to the reservoir 10 to receive print substance from the interior cavity 24 through the outlet 30 in response to print operations. Print substance can be transferred out of the reservoir 10 under positive pressure to the printhead 36 for dispensing onto a medium, by way of non-limiting example. The printhead 36, as used herein, can include any suitable print dispensing mechanism.

During filling operations, print substance is moved from the removable supply source 38 into the reservoir 10 via operation of the supply pump 34. In one example, a single supply pump 34 can be associated with one reservoir 10 to assist in a filling or refilling operation thereof. In another example, a single supply pump 34 can assist filling or refilling a plurality of reservoirs, such as reservoir 10. The supply pump 34 can have different states. For example, the supply pump 34 can be in an active state, meaning that it is working to move print substance, or it can be in an idle state, meaning that it is not working to move print substance. In some examples, the supply pump 34 can be a high-flow pump. In some examples, the supply pump 34 can have an operating pressure of 25 psi (172 kPa) to 35 psi (241 kPa), for example. Other suitable operating pressures are also acceptable.

In some examples, the active vent valve 14 is electrically coupled to the supply pump 34 used to transport print substance from the removable supply source 38 when fluidly coupled to the reservoir 10. The active vent valve 14 can be activated and transitioned to an open, or energized, state in response to signals corresponding to the supply pump 34 being activated. Correspondingly, the active vent valve 14 can be de-activated and transitioned or maintained in a closed, or de-energized, state when the supply pump 34 is de-activated or inactive. For example, a loss of power event during a filling operation would de-activate the supply pump 34 and terminate transfer of print substance into the reservoir 10 and would also terminate power to the active vent valve 14, deactivating the active vent valve 14 and transitioning the active vent valve 14 to a closed position.

In the event that the active vent valve 14 is inoperable, the passive pressure relief valve 18 can be fluidly opened in response to an increased pressure within the reservoir 10. As printing operations are completed, print substance is transferred from the reservoir 10 to the printhead 36 and the volume, or level, of print substance within the reservoir 10 are depleted. The passive inlet valve 16 can be fluidly opened in response to a drop in pressure within the reservoir 10 to allow gas (e.g., air) into the reservoir 10. The valves 14, 16, 18, can be fluidly closed when not the printing operations (e.g., receiving or extracting print substance to/from the reservoir 10) are not ongoing, such as to reduce the possibility of print substance leakage.

The printhead 36 can be fluidically coupled to the reservoir 10 to extract print substance from the reservoir to allow the printhead 36 to selectively deposit an amount of print substance onto a surface of a medium during a printing operation. In one example, a pump (not shown) can draw print substance from the reservoir 10 to the printhead 36. In some examples, a number of valves and/or additional pumps can be included to assist with selectively transferring print substance into the reservoir 10 through the inlet 28 and/or out of the reservoir through the outlet 30 to the printhead 36.

Figure 3:
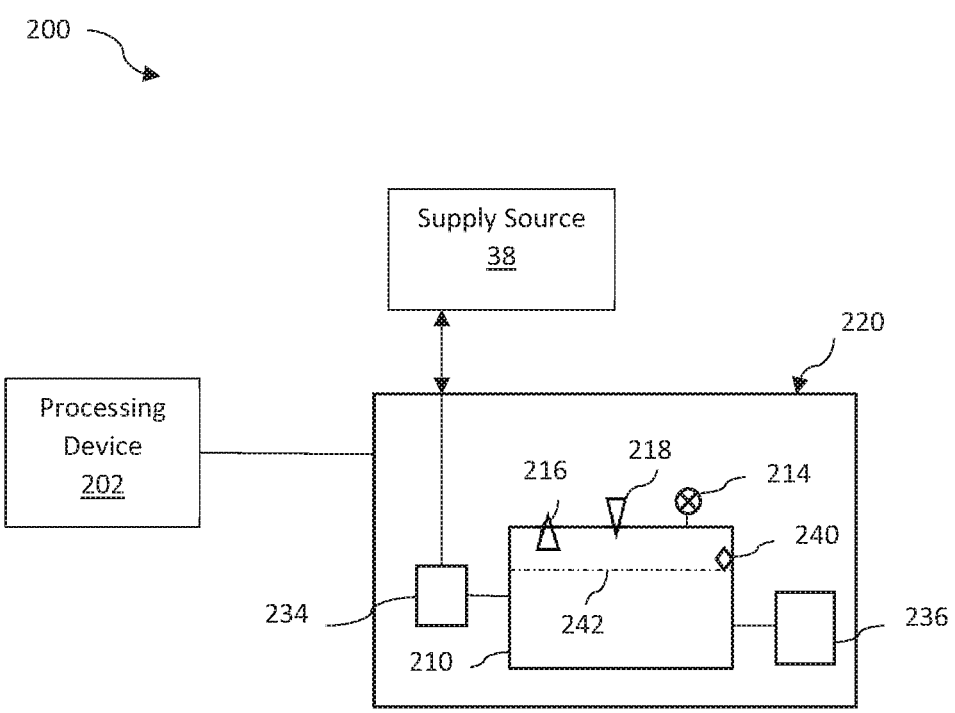
FIG. 3 is a block diagram of an example printing system in accordance with aspects of the present disclosure.

FIG. 3 is a block diagram of a printing system 200 in accordance with aspects of the present disclosure. A processor, controller, and/or other processing device 202 may initiate a filling process within a printing device 220 to transfer an amount of print substance from a removable supply source 38 into a reservoir 210 arranged in the printing device. The reservoir 210 is similar to the reservoir 10 described above and includes aspects of the reservoir 10. In particular, the reservoir 210 includes an active vent valve 214, a passive inlet valve 216, and a passive pressure relief valve 218 akin to valves 14, 16, 18 included with the reservoir 10 described above.

The reservoir 210 can include a fluid level sensor 240 responsive to execution of computer executable instructions by a processing device 202 of the printing device 220, determine at any time the level of print substance within the reservoir 210. The printhead 236 can be fluidically coupled to the reservoir 210 to extract print substance from the reservoir 210. To effectuate a print substance refill operation, the processing device 202 can activate a supply pump 234 upstream of the reservoir 210 such that print substance can be drawn from the removable supply source 38 to the reservoir 210. In response to the activation of the supply pump 234, an active vent valve 214 can be activated to fluidly open the reservoir 210 to the atmosphere and allow gases to travel from the reservoir 210 as the reservoir 210 is filled with print substance. The processing device 202 can receive indications of the level of print substance within the reservoir 210 during the filling process, such as from the fluid level sensor 240, and de-activate the supply pump 234 and the active vent valve 214 when the desired fill volume has been achieved. In one example, a fluid level sensor 240 is disposed on, or in, the reservoir 10 and defines when to terminate a fluid delivery operation. That is, the fluid level sensor 240 can indicate when the reservoir 10 has reached a predetermined fill volume (e.g., print substance is filled to a fill volume line, indicated by dashed line 242) such that a reservoir fill operation can be terminated, deactivating the supply pump 234 and the active vent valve 214 and closing the active vent valve 214.

Figure 4:
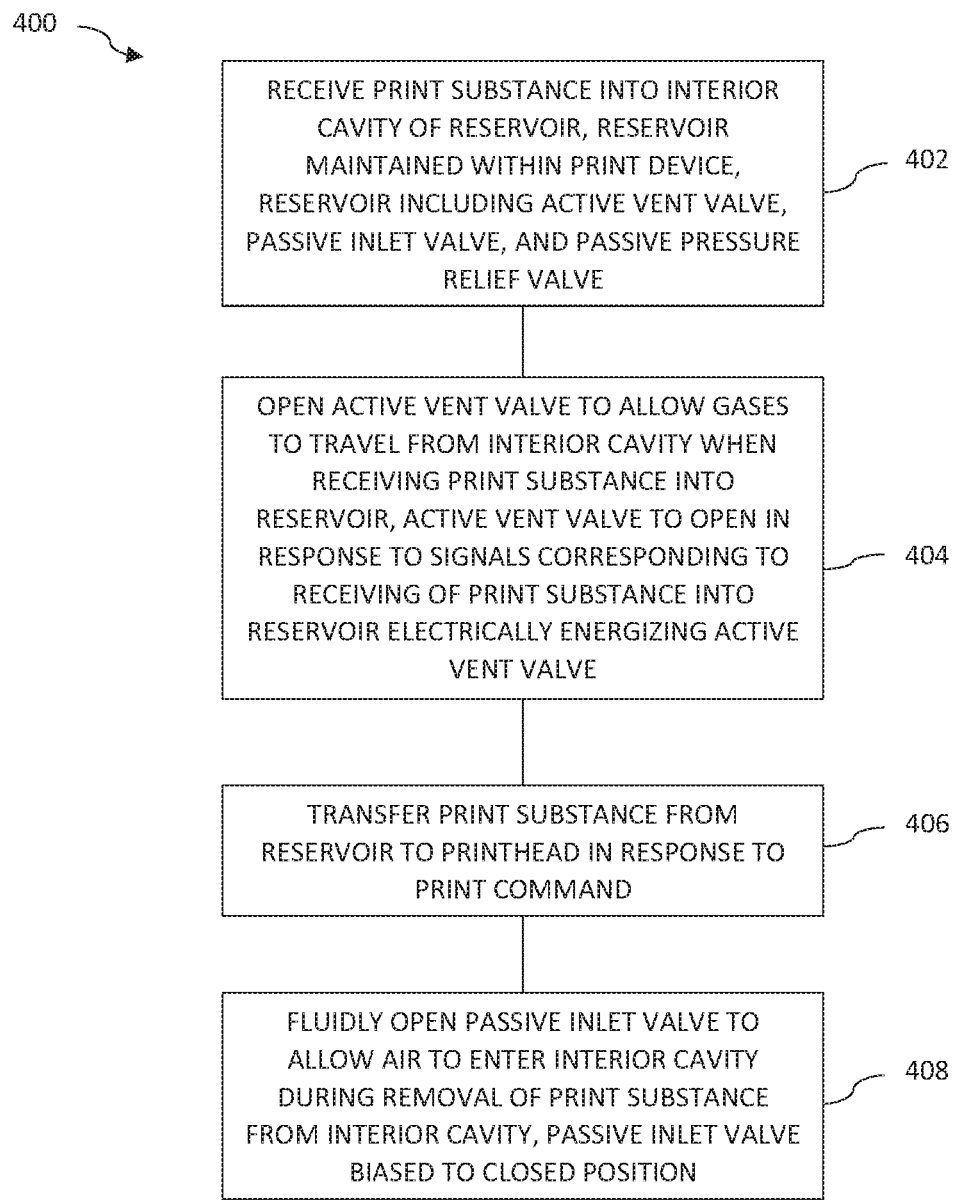
FIG. 4 is a flow diagram of an example method of operating a print system in accordance with aspects of the present disclosure.

FIG. 4 is a flow diagram of an example method 400 of operating a print system in accordance with aspects of the present disclosure. At 402, a print substance is received into an interior cavity of a print reservoir. The print reservoir is arranged within the print device. The reservoir includes an active vent valve, a passive inlet valve, and a passive pressure relief valve. At 404, the active vent valve is opened to allow gases to travel from the interior cavity when receiving the print substance into the reservoir. The active vent valve is to open in response to signals corresponding to receiving of the print substance into the reservoir, the signals electrically energizing the active vent valve. At 406, print substance is transferred from the reservoir to a printhead in response to a print command. At 408, a passive inlet valve is fluidly opened to allow air to enter the interior cavity during removal of the print substance from the reservoir. The passive inlet valve is biased to a closed position. In some examples, air can be vented from the interior cavity when an atmospheric pressure within the interior cavity is greater than a predetermined pressure limit through a passive pressure relief valve.

Although specific examples have been illustrated and described herein, a variety of alternate and/or equivalent implementations may be substituted for the specific examples shown and described without departing from the scope of the present disclosure. This application is intended to cover any adaptations or variations of the specific examples discussed herein. Therefore, it is intended that this disclosure be limited only by the claims and the equivalents thereof.

The invention claimed is:

1. A print substance reservoir for a printing system, comprising:
  a housing to be arranged within a printing device, the housing having an interior for containing a print substance and an exterior, the housing including an inlet to receive the print substance and an outlet to supply the print substance to a printhead;
  an active vent valve to allow gases to travel from the interior to the exterior when the inlet is receiving the print substance, the active vent valve electrically energizable and de-energizable in response to signals corresponding to the transfer of the print substance into the housing, wherein the active vent valve is electrically coupled to a supply pump to receive signals from the supply pump to energize and operably open the active vent valve in response to the supply pump transferring the print substance into the housing;
  a passive inlet valve to open to allow gases to travel to the interior from the exterior during extraction of the print substance from the housing, the passive inlet valve biased to a closed position; and
  a passive pressure relief valve to open when pressure within the interior is greater than a predetermined pressure limit, the passive pressure relief valve biased to a closed position.

2. The print substance reservoir of claim 1, wherein the active vent valve is in a de-energized state when the supply pump in inactive.

3. The print substance reservoir of claim 1, wherein the inlet is configured to be selectively fluidly coupled to a supply source.

4. The print substance reservoir of claim 1, wherein the passive inlet valve or the passive pressure relief valve comprises a one-way check valve.

5. A printing device, comprising:
  a print device housing;
  a reservoir arranged in the print device housing, the reservoir including:
    an interior cavity to contain a print substance;
    an active vent valve to allow gases to travel from the interior cavity when receiving the print substance, the active vent valve electrically energizable to operably open in response to signals corresponding to transferring of the print substance into the housing, wherein the active vent valve is electrically coupled to a supply pump to receive signals from the supply pump to energize and operably open the active vent valve in response to the supply pump transferring the print substance into the housing,
    a passive inlet valve to fluidly open to allow air to enter the interior cavity during extraction of the print substance from the reservoir, the passive inlet valve biased to a closed position, and
    a passive pressure relief valve to open when pressure within the interior cavity is greater than a predetermined pressure limit, the passive pressure relief valve biased to a closed position;
  the supply pump to transfer the print substance from a supply source fluidly coupled to the interior cavity of the reservoir; and
  a printhead fluidly coupled to the reservoir to receive the print substance from the interior cavity in response to print operations.

6. The print device of claim 5, wherein the passive pressure relief valve has a cracking pressure of approximately 69 kilopascals.

7. The print device of claim 5, wherein the passive inlet valve or the passive pressure relief valve is a one way check valve.

8. The print device of claim 5, wherein the supply pump is a high-flow pump.

9. A method of operating a print device, comprising:
  receiving a print substance into an interior cavity of a reservoir, the reservoir arranged within the print device, the reservoir including an active vent valve, a passive inlet valve, and a passive pressure relief valve;
  opening the active vent valve to allow gases to travel from the interior cavity when receiving the print substance into the reservoir, the active vent valve opening in response to signals corresponding to receiving of the print substance into the reservoir electrically energizing the active vent valve, wherein the active vent valve is electrically coupled to a supply pump to receive signals from the supply pump to energize and operably open the active vent valve in response to the supply pump transferring the print substance into a housing;
  transferring the print substance from the reservoir to a printhead in response to a print command; and
  fluidly opening a passive inlet valve to allow gases to enter the interior cavity during removal of the print substance from the interior cavity of the reservoir, the passive inlet valve biased to a closed position.

10. The method of claim 9, comprising:
  venting gases from the interior cavity when a pressure within the interior cavity is greater than a predetermined pressure limit through a passive pressure relief valve.

11. The method of claim 9, comprising:
  fluidly connecting a supply source to an inlet of the reservoir; and
  operating the supply pump to transfer the print substance from the supply source into the interior cavity.

12. The method of claim 11, comprising:
disconnecting the supply source from the inlet of the reservoir upon completion of the transfer of the print substance.

13. The method of claim 9, comprising:
de-energizing the active vent valve to close the active vent valve.

* * * * *